EDUARD M. FISCHEL
INVENTOR.

July 31, 1962      E. M. FISCHEL      3,046,794
ACCELEROMETER

Filed July 19, 1960      2 Sheets-Sheet 2

EDUARD M. FISCHEL
INVENTOR.

BY Andrew L. Bain
George B. Aupperett
ATTORNEYS

United States Patent Office 3,046,794
Patented July 31, 1962

3,046,794
ACCELEROMETER
Eduard M. Fischel, Caldwell, N.J., assignor to General Precision Inc., Little Falls, N.J., a corporation of Delaware
Filed July 19, 1960, Ser. No. 43,806
1 Claim. (Cl. 73—517)

The present invention relates to accelerometers, and more particularly to accelerometers designed for use in field missiles and vehicles.

It is well known that numerous types of accelerometers are presently available. Accelerometers having a mass moving in a magnetic field are also well known. However, most of the accelerometers now on the market are extremely complicated and delicate instruments which have to be placed in the vehicle whose acceleration is to be measured with great care. For this reason, missiles are usually shipped intact from factories to the field or test centers and there they are used with little assembly and modification unless the test center has trained engineers and elaborate equipment to install the accelerometer. On the other hand, there is a need for a field type of accelerometer which can be installed in missiles by workmen or military personnel with little training under crude conditions. Since an accelerometer must be a highly accurate instrument, an inconsistency is presented since crude conditions and untrained personnel obviously do not go together with complicated precise scientific instruments requiring precise installation. Although many attempts have been made to resolve the foregoing inconsistency and provide an accelerometer which is small, accurate and of simple design and construction for missile or field vehicle use, which could be adjusted and installed by untrained personnel, none, as far as I am aware has ever been successful when put into practice under actual field or test conditions.

It has now been discovered that a small, accurate, and rugged accelerometer can be provided of sufficiently simple construction as to make it suitable for use in the field by untrained personnel. Furthermore, the accelerometer contemplated has a minimum of parts to handle.

Thus, it is an object of the present invention to provide an accelerometer which is of simple construction and can be handled by untrained personnel.

Another object of the present invention is the provision of an accelerometer which is of sturdy construction and can stand abuse under field conditions and in a missile or vehicle in flight.

Still another object of the invention is to provide an accelerometer so constructed that the components are readily available, readily assemblable, and easy to get at and to repair.

The invention also contemplates providing a device which can simultaneously furnish a function of the velocity and the acceleration useful in connection with an autopilot control which autopilot in turn drives the instrument to zero. The acceleration function is used for damping, the velocity function serves to keep any error very small.

Generally speaking, the present invention contemplates an accelerometer comprising a housing, a rocker arm adapted to be pivotally mounted in said housing, a coil adapted to be mounted towards the free end of said rocker arm, a permanent magnet so disposable within said housing that said magnet poles surround said coil, a potentiometer mountable in said housing, the wiper of said potentiometer being moved by the action of said rocker arm, and, an electrical circuit having components i.e., means, including a capacitor insertable between said potentiometer and said coil so as to energize said coil in proportion to the wiper displacement, the energization of said coil in association with the magnetic field of said magnet forming a torque which is a function of the acceleration; the voltage stored in the capacitor providing a function of the velocity.

With the foregoing objects and brief explanation in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawing in which.

Figure 1:
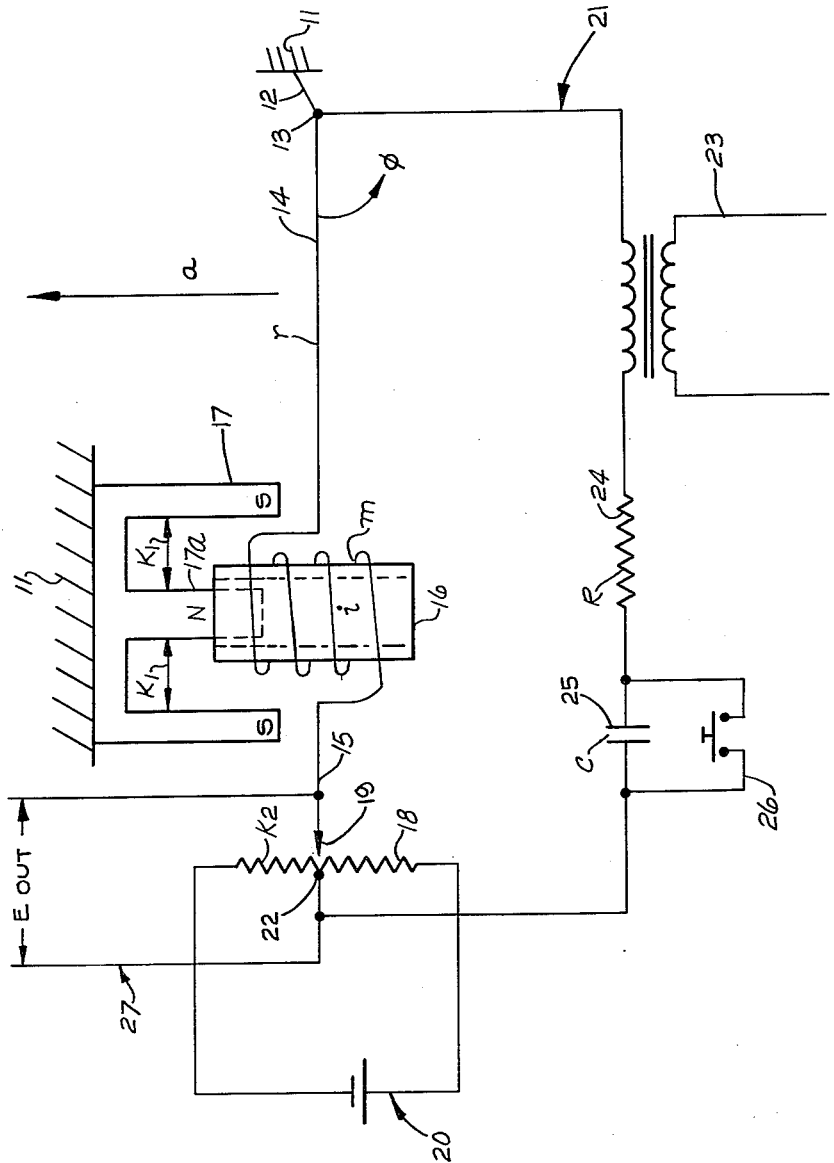
FIGURE 1 is a schematic explanation of the invention herein contemplated.
Figure 2:
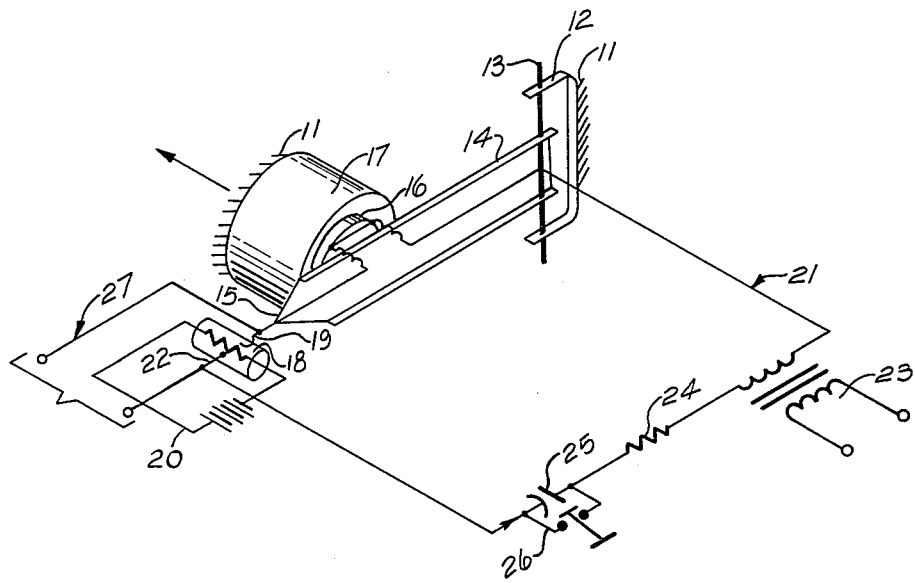
FIGURE 2 shows a partially perspective and partially schematic view of some of the constructional features of the device explained schematically in FIGURE 1; and, FIGURE 3 illustrates a top view of the device herein contemplated.
Figure 3:
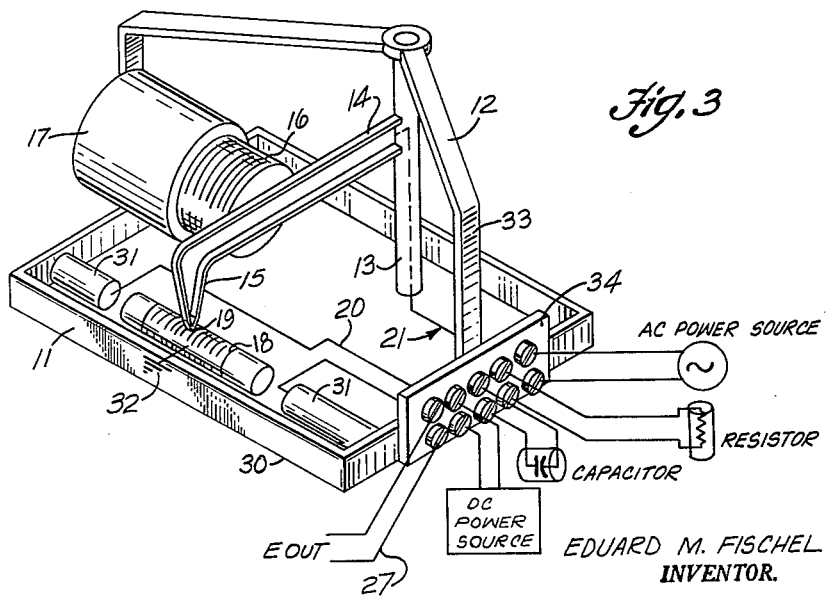

Referring now to the drawing for a more detailed explanation of the invention herein contemplated, there is first shown a housing 11 having a support 12 mounted therein, said support being adapted to hold a pivot axle 13 at one end of the housing. Mounted on said pivot axle 13 is a rocker arm 14 adapted to freely swing in said housing. Towards the free end 15 of the rocker arm 14 is a non-magnetic coil, e.g., a copper coil 16 so disposed with respect to arm 14, that the coil axis is generally at right angles to the arm length. Surrounding the coil is a cup-shaped magnet 17, having an inner pole 17a shown in FIGURE 1, the coil and magnet being so arranged that the coil may freely swing in an arcuate path within the cup. Thus, coil 16 towards arm end 15 of rocker arm 14 forms a mass, and any acceleration in the direction of the arrow will tend to move the coil out of the cup.

At the end of rocker arm 14 is a potentiometer 18. This potentiometer differs somewhat from the ordinary potentiometer in that there is one wiper and three terminals. The wiper 19 travels longitudinally over the potentiometer, but, besides the two end terminals there is a center tap or terminal 22 at the electrical resistance midpoint between the two end terminals. Arm end 15 is connected to the potentiometer wiper 19, physically moving the wiper as the rocker arm 14 swings in the housing. Three separate circuits are associated with the device. First there is a D.C. circuit 20 providing a drop in potential across the end windings of the potentiometer. Associated with the coil in the magnetic cup is an A.C. input circuit 21 between the potentiometer center tap 22 and potentiometer wiper 19 across coil 16. In the A.C. input circuit 21 there is an A.C. excitation power source 23, a resistor 24 and a capacitor 25. The power source, resistor and capacitor are in series, and across capacitor 25 is a short switch 26 which is usually on during standby operation. The output circuit 27 is between the center tap 22 of the potentiometer and the wiper 19 attached to rocker arm 14. The windings of coil 16 are in such direction that the action of the magnet 17 on the energized coil 16 will tend to counter-act the energization of the coil.

During standby operation, switch 26 is on. As long as wiper 19 is opposite center tap 22, no D.C. current will flow in input circuit 21 and output circuit 27. If wiper 19 swings in one direction, there is a drop in potential across circuit 21 in one or the other direction, depending on the direction of the swing. This will energize coil 16. Because of the direction of the windings in coil 16, if the swing of arm 14 is outwards, the coil polarity will be opposite the polarity of magnet 17; this will draw the coil back into the magnet cup. If on the other hand, the swing of the arm is inwards, the drop in potential is in the other direction so that the polarity of the coil is the same as that of magnet 17. This will push the coil back from the cup bottom. In this way, the rocker arm 14 tends to stay so that wiper 19 is opposite center tap 22. Upon the start of acceleration, e.g., the firing of a missile, flight of an aircraft, etc., capacitor short switch 26 is opened. Now, a steady D.C. current from circuit 20 can no longer actuate coil 16 since a capacitor requires a changing voltage. The missile or vehicle acceleration however will move rocker arm 14 across the face of the potentiometer. There is thus a changing increase or drop in potential at the instant of acceleration between wiper 19 and center tap 22. Coil 16 is thus energized in the direction to create poles opposed to the poles of magnet 17 tending to bring the coil back into the cup. But, as the acceleration increases, wiper 19 continues to move across the potentiometer until acceleration ceases and the vehicle or missile has attained running velocity. During acceleration the voltage drop across the resistor is thus a function of the acceleration which in turn may be read, or is reflected by the voltage drop between the wiper and the center tap of the potentiometer. During steady unaccelerated flight, the A.C. excitation voltage supplied circuit 21 by power source 23 maintains the system dynamic so as to avoid coulomb friction when responding to the action of acceleration. The signal from the output circuit can be used to drive the electro-pneumatic valves for missile actuators. At the same time, the voltage stored in the capacitor is an integral of the accelerations, i.e., velocity.

As hereinbefore mentioned, the accelerometer herein contemplated may have to be worked on at a test station or in the field. The components must thus be designed for performance within certain limits and must be such that they can readily be worked on by persons with little training.

Looking for a moment at FIGURE 1, it is apparent that two torques are created. There is a torque created by the acceleration, $a$; the mass of the coil, $m$; and the arm length, $r$. The acceleration torque is thus $m.a.r$. At the same time, there is a torque created by imparting of a magnetic field within the magnet cup. Since this field is created by the combined effect of current $i$, flowing through the coil and the magnetic field factor of the magnet which may be represented as $K_1$, the magnetic torque is $K_1.i$. At steady state all torques must equal zero, i.e., balance, $$mar = K_1 i \text{ and } i = \frac{mar}{K_1}$$

At the same time, the sum of all voltages must equal zero. Since there is an output from circuit 21 between the wiper and the center tap, this voltage must equal the voltage drop across the capacitor, resistor and coil of circuit 21. The voltage drop across the capacitor, resistor and coil is at any moment:

$$E_{out} = Ri + \frac{1}{C}\int(idt)$$

where R is the resistance of circuit 21, i.e., the coil resistor and capacitance circuit in ohms, C is the capacitance of the capacitor in farads and $\int(idt)$ is a function of the current multiplied by the time. The voltage drop across the potentiometer causing the voltage drop across the capacitor and coil is equal to $K_2.\phi$, where $K_2$ is the scale factor of the potentiometer and $\phi$ the angle of swing of the rocker arm.

The shape and size of individual components will of course depend on the vehicle or missile into which the device is to be incorporated. The electrical parameters depend on $K_1$ and $K_2$, i.e., on the magnetic field factor of the coil and on the scale factor of the potentiometer. Using the formulas hereinbefore outlined, $$E_{out} = K_2\phi = Ri + 1/C\int(idt); \quad i = mar/K_1$$

$$E_{out} = K_2\phi = R\frac{mar}{K_1} + \frac{1}{C}\cdot\frac{mr}{K_1}\int(adt)$$

$$= \frac{mr}{K_1}(Ra + 1/C\int adt)$$

but by definition $\int adt$ is equal to the velocity $v$, and thus, $$E_{out}K_2\phi = (Ra + 1/Cv) \times \frac{mr}{K_1}$$

By the arrangement described, the drop in potential across the resistor 24 provides a measure of the acceleration while the charge stored in the capacitor 25 gives a function of the velocity. But, the output 27 must be connected to an autopilot which will tend to drive to zero so as to discharge the capacitor. Thus, the velocity of the missile is controlled by the autopilot. Changes in velocity are sensed by the accelerometer which communicates the information through circuit 27 to the autopilot. The autopilot in turn corrects the velocity, bringing the accelerometer back to zero.

As the initial acceleraiton is unidirectional, the capacitor may be charging during an extended time before acted on by the autopilot. This time factor will to a large extent determine the size of C. The intended velocity $v$ for the particular vehicle or missile will also be known. The length of the rocker arm and its swing angle depends on the accelerometer size. Thus, the value of resistor R will depend on the coil and magnet combination which provides the factor $K_1$. This coil and magnet combination will also then determine the value of the potentiometer resistance as the angle $\phi$ is relatively limited. The device described therefore within certain limits can be adjusted by simply changing the values of the resistor in the coil and capacitor circuit, and of the potentiometer. This is of course a great advantage since resistors and potentiometers of all sizes, shapes and values are readily available and the adjustment of this type of component is not over complicated.

In actual construction housing 11 has a base 30 containing the necessary wire network. At opposing sides of one end of the base are terminals 31 adapted to engage the ends of potentiometer 18. A third terminal 32 engages the potentiometer center tap 22. Straddling the base and potentiometer 18 is a bridge 33, and depending from the center portion of the bridge to the base is pivot rod 13. Affixed to one leg of bridge 33 is cup shaped magnet 17 with its inner pole disposed just about above the potentiometer. Rocker arm 14 is mounted on pivot rod 13 and has the coil 16 towards arm 15. However, in actual construction, unlike in the schematic drawing, arm end 15 is preferably bent at an angle to the main portion of the arm so that the wiper 19 is almost underneath the cup rather than past the cup as shown in the schematic explanation. This is purely to make the device more compact. Affixed to the other leg of bridge 33 is a terminal panel 34. To this panel are connected the D.C. power source, the A.C. power source, the resistor and capacitor.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

In an accelerometer, in combination, a base containing the accelerometer wire network;
potentiometer terminals at opposed sides of said base;

a potentiometer intermediate said potentiometer terminals;

a center tap on said potentiometer;

a bridge straddling said base and potentiometer including legs and a center portion thereof;

a pivot rod depending from said bridge center portion;

a cup-shaped magnet affixed to one of said bridge legs with inner and outer poles;

a rocker arm, one end of which is mounted on said pivot rod;

a coil towards said rocker arm other end adapted to swing in and out of said cup-shaped magnet between said inner and outer poles;

a potentiometer wiper connected to said rocker arm other end in series with said coil;

a terminal panel affixed to said bridge other leg;

D.C. terminals on said panel for the D.C. power input of a D.C. circuit extending from said panel to said potentiometer terminals to provide a D.C. drop in potential across said potentiometer;

A.C. terminals on said panel for the A.C. power input, and including an A.C. circuit extending from said panel to said potentiometer wiper and potentiometer center tap through said coil said A.C. circuit providing an A.C. excitation current to energize said coil and creating a D.C. drop across said coil as said wiper is displaced along said potentiometer from said center tap, the windings on said coil and the polarity of said D.C. source being such that when said coil is subjected to a D.C. drop because of said displacement, as said coil on said rocker arm swings inward in said cup-shaped magnet, the polarity of the field created by the coil will be such as to tend to repel said coil outwards, while when said coil swings outward of said cup-shaped magnet, the field created by said coil will tend to attract said coil into said cup-shaped magnet;

resistor terminals in said panel in series with said A.C. circuit terminals, for a series resistor for said coil, the drop in potential across said resistor being a function of acceleration;

capacitor terminals in said panel in series with said resistor terminals and A.C. circuit terminals, for a capacitor designed to build up a potential in said A.C. circuit by the displacement of said potentiometer wiper from said potentiometer center tap; and, output terminals in said panel furnishing to utilization means the drop in potential in said A.C. circuit between said potentiometer wiper and said center tap.

References Cited in the file of this patent

UNITED STATES PATENTS

| | | |
|---|---|---|
| 1,999,646 | Wittkuhns | Apr. 30, 1935 |
| 2,532,723 | Knoop | Dec. 5, 1950 |
| 2,704,326 | Whitson et al. | Mar. 15, 1955 |
| 2,780,101 | Kinkel | Feb. 5, 1957 |
| 2,839,922 | Manildi | June 24, 1958 |
| 2,849,669 | Kinkel | Aug. 26, 1958 |
| 2,904,735 | Cullen et al. | Sept. 15, 1959 |